(12) United States Patent
Meslin et al.

(10) Patent No.: US 12,083,720 B2
(45) Date of Patent: Sep. 10, 2024

(54) HYBRID PART MADE OF COMPOSITE MATERIAL COMPRISING AT LEAST ONE METAL INSERT AND METHOD FOR MANUFACTURING SUCH A PART

(71) Applicant: FAURECIA AUTOMOTIVE COMPOSITES, Nanterre (FR)

(72) Inventors: Lionel Meslin, Le Rheu (FR); Yves Bonnemayre, Marpire (FR); Arnaud Caradec, Plerguer (FR); Hervé Motte, Les Sorinieres (FR); Denis Lattay, Mont-Dol (FR)

(73) Assignee: FAURECIA AUTOMOTIVE COMPOSITES, Nanterre (FR)

( * ) Notice: Subject to any disclaimer, the term of this patent is extended or adjusted under 35 U.S.C. 154(b) by 810 days.

(21) Appl. No.: 16/963,153

(22) PCT Filed: Jan. 17, 2019

(86) PCT No.: PCT/EP2019/051098
§ 371 (c)(1),
(2) Date: Feb. 16, 2021

(87) PCT Pub. No.: WO2019/141754
PCT Pub. Date: Jul. 25, 2019

(65) Prior Publication Data
US 2021/0170646 A1    Jun. 10, 2021

(30) Foreign Application Priority Data

Jan. 18, 2018    (FR) .......................................... 1850412

(51) Int. Cl.
*B29C 45/00*    (2006.01)
*B29C 45/14*    (2006.01)
(Continued)

(52) U.S. Cl.
CPC ...... *B29C 45/14311* (2013.01); *B62D 29/004* (2013.01); *B29K 2705/00* (2013.01); *B29L 2031/3002* (2013.01); *B62D 25/2054* (2013.01)

(58) Field of Classification Search
CPC ..... B29C 45/14311; B29C 2045/14131; B29C 2045/14327; B29C 43/18; B29C 70/682;
(Continued)

(56) References Cited

U.S. PATENT DOCUMENTS

| 1,918,149 | A | * | 7/1933 | Sullivan | .................... E04B 1/86 181/207 |
| 5,672,405 | A | * | 9/1997 | Plank, Jr | ................. B29C 70/78 428/140 |
| 2005/0229530 | A1 | * | 10/2005 | Schmidt | ............ B29C 45/14311 52/630 |

FOREIGN PATENT DOCUMENTS

| EP | 0594131 A1 | 4/1994 |
| EP | 1380493 A2 | 1/2004 |

(Continued)

OTHER PUBLICATIONS

International Search Report for PCT/EP2019/051098 dated Feb. 22, 2019.
Written Opinion for PCT/EP2019/051098 dated Feb. 22, 2019.

*Primary Examiner* — Dennis H Pedder
(74) *Attorney, Agent, or Firm* — Sandberg Phoenix & von Gontard P.C.

(57) ABSTRACT

The invention concerns a hybrid part (11) for a motor vehicle, comprising at least one metal insert (1) overmoulded in a layer of plastic or composite material (17), the insert (1) being at least partially covered on at least one of its faces (7a, 7b) by a layer of material of a given thickness; and comprising at least one relief (5) extending from one of its faces (7a, 7b). The height exhibited by the relief or reliefs (5) is less than or equal to the thickness of the layer of plastic (Continued)

or composite material overmoulded on said face (*7a*, *7b*) of the insert (1), so that the contact between the reliefs (5) and the walls of the mould ensures the positioning of the insert (1) in the mould during the overmoulding operation.

14 Claims, 4 Drawing Sheets

(51) Int. Cl.
      *B62D 29/00*         (2006.01)
      *B29K 705/00*      (2006.01)
      *B29L 31/30*       (2006.01)
      *B62D 25/20*      (2006.01)

(58) Field of Classification Search
      CPC .......... B29C 72/885; B29C 45/143336; B29C 45/14221; B62D 29/004; B62D 29/2054; B62D 29/20; B62D 29/2019; B62D 29/2027
      USPC .......... 296/187.01, 193.07, 204, 900, 901.01
      See application file for complete search history.

(56) References Cited

FOREIGN PATENT DOCUMENTS

| | | | | |
|---|---|---|---|---|
| EP | 3194253 B1 * | 1/2019 | .......... | B60R 13/083 |
| FR | 2866306 A1 | 8/2005 | | |
| WO | 2001087568 A1 | 11/2001 | | |
| WO | 2014131967 A1 | 9/2014 | | |
| WO | 2017115026 A1 | 7/2017 | | |
| WO | 2017191610 A1 | 11/2017 | | |

\* cited by examiner

HYBRID PART MADE OF COMPOSITE MATERIAL COMPRISING AT LEAST ONE METAL INSERT AND METHOD FOR MANUFACTURING SUCH A PART

CROSS-REFERENCE TO RELATED APPLICATIONS

This application is the U.S. National Stage under 35 USC § 371 of International Application No. PCT/EP2019/051098, filed 17 Jan. 2019 which claims priority to French Application No. 1850412 filed 18 Jan. 2018, both of which are incorporated herein by reference.

BACKGROUND

The invention relates to hybrid parts comprising a plastic or composite material and at least one metal insert, such as, for example, vehicle load floors or electric vehicle battery cases, as well as to motor vehicles comprising such hybrid parts. The invention also relates to the methods of manufacturing such hybrid parts.

In order to lighten the overall weight of vehicles and therefore to reduce carbon dioxide emissions, the automotive industry uses hybrid parts comprising one or more metal elements (inserts) in plastic or composite bodies. The composite materials comprise a matrix of thermoplastic material or of thermosetting material, loaded with reinforcing elements such as, for example, glass fibers or carbon fibers. This is particularly the case for certain rear load floors of vehicles. Such floors are, for example, described in WO2014131967. They consist of a part made of composite material and a peripheral metal border intended to be welded to the rear metal part of a motor vehicle base. This metal border (insert) is partially embedded in the composite material during the manufacture of the floor.

The techniques for manufacturing parts by molding or overmolding are known. For example, WO2001087568 discloses a method of manufacturing a molded part from a plastic/metal compound by internal high pressure to form a metal tubular semi-finished product. In the disclosed method, the semi-finished product is placed in a forming tool at least in two parts, the forming space of which corresponds to the outer contour of the part to be molded. The forming tool is then closed. The tubular semi-finished product is insulated at its open front sides by means of a pressure-proof packing and is formed, in the forming space, from at least one front side by means of a molten polymer under high pressure. The molten polymer is compressed into the semi-finished product by injection molding using a conventional injection molding aggregate. Once the molten polymer is sufficiently solidified at the walls of the metal molded part, the molten polymer is removed from the part, so as to obtain a metal molded part provided with an internal plastic coating.

EP0594131 discloses a composite vehicle underframe structure having improved structural performance through the use of closed structural profiles, the orientation of the reinforcing fibers, and the selected use of steel inserts, compared to comparable steel structures. The inserts present means for fixing the fiber reinforcement to help guarantee their positioning during the injection of the polymer resin. The implementation of such a solution therefore involves the use of fiber reinforcements.

WO2017115026 discloses a method of molding a part comprising at least one partially overmolded insert. Unfortunately, the proposed solution involves the use of specific molds having a system for positioning and maintaining the insert in the mold. It would be desirable to find simpler solutions for maintaining an insert in position in a mold during the manufacture of a part.

SUMMARY

The object of the invention is to solve at least one of the problems encountered in the prior art by proposing a new hybrid part made of composite material and comprising at least one metal insert, the part comprising at least one insert which is itself configured to ensure its positioning in the injection mold. Another object of the invention is to propose a new method for manufacturing such hybrid parts. Finally, the invention relates to novel metal inserts which are functionalized in that they comprise means for positioning the insert in a mold, for example for molding or overmolding by compression or by injection. For example, the molding can be done by compression of a sheet molding compound (SMC), or of a glass mat thermoplastic (GMT).

To this end a hybrid part for a motor vehicle comprising at least one metal insert overmolded in a layer of plastic or composite material, the insert comprising a body defining an upper face and a lower face, and being at least partially covered on at least one of its faces by a layer of the plastic or composite material of a defined thickness. The insert comprises at least one relief extending from one of its faces and in that the height of the at least relief is less than or equal to the thickness of the layer of plastic or composite material overmolded on the face of the insert.

As will be understood from reading the definition which has just been given, the part with functionalized inserts has at least one relief which is intended to bear on the wall of the mold during the part molding operation, including overmolding of the insert. Preferably, the molding method used is an injection molding method. The relief(s) will act as wedge(s) ensuring the positioning of the insert in the mold according to a predefined position. Once the part is molded, the relief(s) is (are) contained in the thickness of the layer of plastic or composite material overmolded on the face of the insert from which they extend. According to a preferred embodiment of the hybrid part, the reliefs exhibited by the insert are not intended to protrude from the layer of plastic or composite material in which they are embedded. They are intended to be fully contained therein.

According to particular embodiments, the part can comprise one or other of the following features taken in isolation or in all possible combinations:
- The, or at least one of the, reliefs is entirely contained in the thickness of the layer of plastic or composite material overmolded on the face of the insert.
- The insert comprises at least one relief extending from each of its lower and upper faces.
- The insert is a profile comprising at least one lateral face and the insert comprises at least one relief extending from the, or at least one of the, lateral faces.
- The metal insert comprises at least three non-aligned reliefs extending from one of its faces, preferably from each of its faces.
- The height exhibited by the relief(s), as measured from the face of the insert from which they extend, is equal to the thickness of the layer of plastic or composite material, overmolded on the face of the insert.
- At least one relief is combined with a creep path allowing the passage of the plastic or composite material through the insert during the overmolding operation.

The insert further comprises at least one creep hole allowing the passage of the plastic or composite material through the insert during the overmolding operation.

The relief(s) is (are) in the form of bumps, ribs, rimmed holes, tabs cut out and bent from the body of the insert and/or in the form of stamped sheet metal strips cut from the body of the insert and having two ends connected to the body.

The relief(s) is (are) in the form of a bump associated with a creep path, the insert having a hollow shape on the face opposite that comprising the relief, complementary to the bump shape, facing the bump shape.

The relief(s) is (are) obtained by deformation of the sheet forming the body of the insert, so as to form a hollow shape on the face of the sheet opposite that comprising the relief, the hollow shape being complementary to shape of the bump, facing the bump.

The relief(s) is (are) elongated convex zones.

A creep path is disposed at one end of the elongated convex zone.

The insert is in the form of a metal sheet or a profile.

The hybrid part constitutes a load floor made of composite material comprising a metal border which is intended to be welded to the rear part of the base of a motor vehicle; preferably the metal border is a free part of a metal insert that is partially overmolded into the composite material from which the floor is made.

According to a second aspect, a vehicle, preferably a motor vehicle, comprises at least one hybrid part as defined according to the first aspect above.

According to a third aspect, an insert for a hybrid part as defined according to the first aspect comprises a body defining an upper face and a lower face and at least one relief extending from one of its faces, the height of the relief being chosen as a function of the thickness of the layer of plastic or composite material intended to be overmolded on the face of the insert, so as to be less than or equal to the thickness of the layer; the insert is preferably in the form of a metal sheet or of a profile.

In particular, an insert for a hybrid part as defined according to the first aspect comprises a body defining an upper face and a lower face and comprising at least one relief extending from one of its faces, and in that the at least one relief is combined with a creep path allowing the passage of the plastic or composite material through the insert during an overmolding operation of the insert. In other words, at least one relief is associated with, or is adjacent to, a creep path.

According to a fourth aspect, a method for manufacturing a hybrid part according to the first aspect is disclosed, wherein the hybrid part comprises at least one metal insert which is at least partly overmolded in a layer of plastic or composite material, the method using a mold comprising a lower part and an upper part, and comprising the following steps:
  placing the insert(s) in the lower part of the mold;
  closing the mold by positioning the upper part on the lower part; and
  injecting the plastic or composite material into the mold;
  the method is remarkable in that the insert or at least one of the inserts comprises at least one relief extending from one of its faces and in that:
    during the operation of placing the insert(s) in the mold, the insert(s) are placed in abutment against the lower part of the mold by the relief(s) extending from their lower face disposed opposite the lower part of the mold; and/or in that during the closing of the mold, the insert(s) is (are) in contact with the upper part of the mold by the relief(s) extending from their upper face disposed opposite the upper part of the mold.

In an alternative, the method of manufacturing a hybrid part as defined according to the first aspect is disclosed wherein the hybrid part comprises at least one insert which is at least partly overmolded by one or more blanks of sheet molding compound (SMC) or glass mat thermoplastic (GMT), the method using a mold comprising an upper part and a lower part and comprising the following steps:
  placing the insert(s) and the SMC or GMT blank(s) in the lower part of the mold, the, or at least one of the, blanks being in contact with the upper or lower face of the, or at least one of the, inserts;
  closing the mold by positioning the upper part on the lower part;
  compressing the insert(s) and the SMC or GMT blank(s), so that the, or at least one of the, inserts is overmolded by the blank(s);
  the method is remarkable in that the insert or at least one of the inserts comprises at least one relief extending from one of its faces and in that:
    when placing the insert(s) in the mold, the, or at least one of the, inserts bears against the, or at least one of the, SMC or GMT blanks by the relief(s) extending from their underside, and/or in that the, or at least one of the, SMC or GMT blanks rests on the, or at least one of the, reliefs extending from the upper face of the, or at least one of the, inserts.

Preferably, a method of manufacturing a hybrid part as defined according to the first aspect is disclosed with the hybrid part comprising at least one insert which is at least partly overmolded by one or more blanks of sheet molding compound (SMC), the method using a mold comprising an upper part and a lower part and comprising the following steps:
  placing the insert(s) and the SMC blank(s) in the lower part of the mold, with the, or at least one of the, blanks being in contact with the upper or lower face of the, or at least one of the, inserts;
  closing the mold by positioning the upper part on the lower part, and heating the mold;
  compressing the insert(s) and the SMC blank(s), resulting in the creep of the SMC blank(s) under the effect of pressure and their crosslinking under the temperature of the mold so that the, or at least one of the, inserts is overmolded by the blank(s);
  the method is remarkable in that the insert or at least one of the inserts comprises at least one relief extending from one of its faces and in that:
    when placing the insert(s) in the mold, the, or at least one of the, inserts bears against the, or at least one of the, SMC blanks by the relief(s) extending from their underside, and/or in that the, or at least one of the, SMC blanks rests on the, or at least one of the, reliefs extending from the upper face of the, or at least one of the, inserts.

According to a variant, a method of manufacturing a hybrid part as defined according to the first aspect is disclosed wherein the hybrid part comprises at least one insert which is at least partly overmolded by one or more blanks of glass mat thermoplastic (GMT), the method using a mold comprising an upper part and a lower part and comprising the following steps:
  heating the GMT blank(s);

placing the insert(s) and the GMT blank(s) in the lower part of the mold, with the, or at least one of the, blanks being in contact with the upper or lower face of the, or at least one of the, inserts;

closing the mold by positioning the upper part on the lower part, the mold not being heated;

compressing the insert(s) and the GMT blank(s), resulting in the creep of the GMT blank(s) under the effect of pressure so that the, or at least one of the, inserts is overmolded by the blank(s);

the method is remarkable in that the insert or at least one of the inserts comprises at least one relief extending from one of its faces and in that:

when placing the insert(s) in the mold, the insert or at least one of the inserts bears against the, or at least one of the, GMT blanks by the relief(s) extending from the underside of the, or at least one of the, inserts, and/or in that the, or at least one of the, GMT blanks rests on the, or at least one of the, reliefs extending from the upper face of the, or at least one of the, inserts.

DESCRIPTION OF THE FIGURES

The invention will be well understood and other aspects and advantages will emerge clearly on reading the following description, which is provided with reference to the attached drawing sheets, in which.

DETAILED DESCRIPTION

In the following description, the term "comprise" is synonymous with "include" and is not limiting in that it allows the presence of other elements in the part or in the vehicle to which it refers and/or other steps in the method to which it refers. It will readily be understood that the term "comprise" includes the terms "consist of." In the various figures, the same references designate identical or similar elements. The term "lower" will denote a greater proximity to the ground than "upper" along a vertical axis. It will be noted that in the context of the following disclosure, the lower and upper faces of the insert are defined with respect to its positioning in the mold during the manufacture of the hybrid part and not according to the future positioning of the part in the vehicle. In the context of the invention, the term "resin" will be considered synonymous with "polymer matrix."

Figure 1:
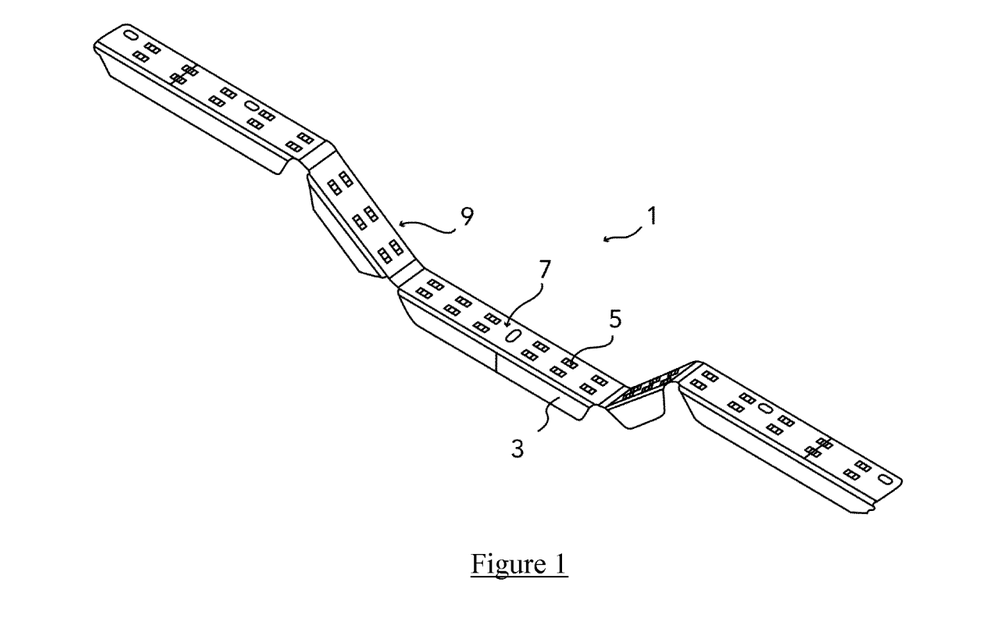
FIG. 1 shows an example of a metal insert.

The invention relates to a hybrid part for a motor vehicle comprising at least one metal insert overmolded in a layer of plastic or composite material. An example of such an insert 1 is shown in FIG. 1. This is an insert intended to form the frame of a load floor of a motor vehicle. More precisely, it is a stamping intended to form the rear part of the frame of a floor (not shown) made of plastic or composite material, preferably of composite material. The insert 1 shown is intended to be only partially overmolded, so that the formed floor has a metal border 3 which can be welded to the base elements of a vehicle. This metal border is said to be free in that it is not covered with plastic or composite material. Nevertheless, the invention can apply to other types of inserts and parts. The invention is remarkable, as we will see in detail, in that the insert 1 comprises at least one relief 5 which is intended to ensure its positioning in the mold during the overmolding operation. For this purpose, the insert 1 comprises at least one relief 5 extending from one of its faces and in that the height of the relief(s) 5 is less than or equal to the thickness of the layer of plastic or composite material, overmolded on the face of the insert 1.

Figure 2:
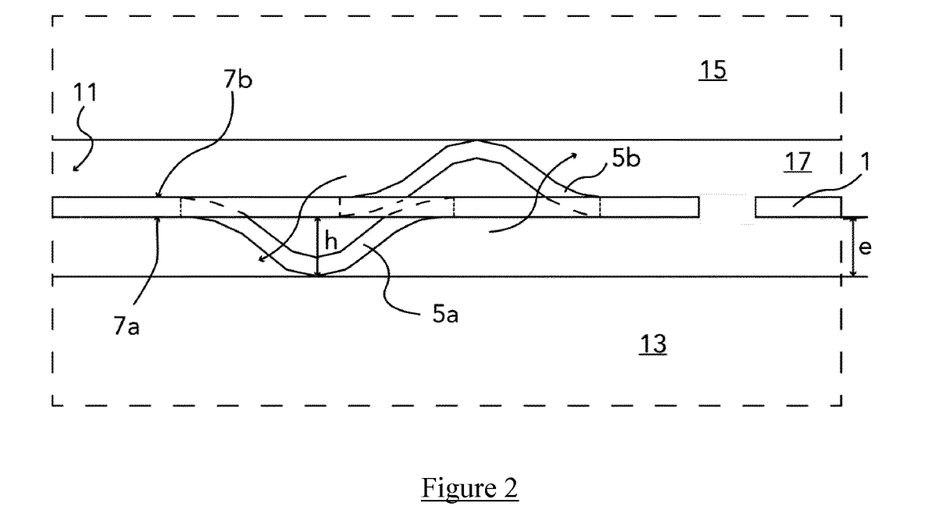
FIGS. 2 and 3 illustrate the positioning of the insert in the mold and in the layer of polymeric material due to the reliefs which it presents on its lower and upper faces.

Preferably, the insert comprises a body 9 in the form of a metal sheet or of a section having a lower face and an upper face (7a, 7b illustrated in FIG. 2). Advantageously, the insert 1 comprises at least three non-aligned reliefs 5 on at least one of its faces 7 and preferably on each of its faces 7a,b. Indeed, in a particularly preferred embodiment, the insert 1 comprises reliefs 5b,a extending from the two upper and lower faces 7b,a, respectively, of its body 9. Those skilled in the art will benefit from the reliefs 5 exhibiting a height similar to that of the thickness of the plastic or composite material which is overmolded on each of the faces of the insert 1.

Figure 3:
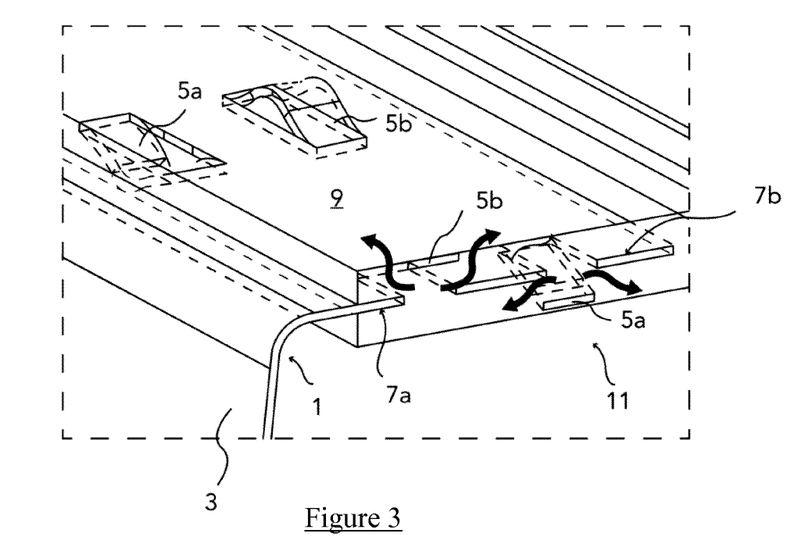

A method of manufacturing, illustrated in FIGS. 2 and 3, a hybrid part 11 comprising at least one insert 1 overmolded in a layer of a plastic or composite material, by means of a mold comprising a lower part 13 and an upper part 15. The method comprises the following steps:

positioning the insert(s) 1 in the lower part 13 of the mold;

closing the mold by positioning the upper part 15 on the lower part 13; and injecting the plastic or composite material 17 into the mold;

the method is remarkable in that the insert or at least one of the inserts comprises at least one relief extending from one of its faces and in that:

during the operation of placing the insert(s) 1 in the mold, the inserts are placed in abutment against the lower part 13 by the relief(s) 5a extending from the lower face 7a of the insert disposed opposite the lower part 13 of the mold, and/or in that during the closing of the mold, the insert(s) 1 is (are) in contact with the upper part 15 of the mold by the relief(s) 5b extending from the upper face 7b of the insert disposed opposite the upper part 15 of the mold.

In a variation, the method of manufacturing a hybrid part comprises overmolding at least one insert with one or more SMC blanks by means of a mold comprising an upper part and a lower part. The method comprises the following steps:

placing the insert(s) and the SMC blank(s) in the lower part of the mold, the, or at least one of the, blanks being in contact with the upper or lower face of the, or at least one of the, inserts;

heating and closing the mold by positioning the upper part on the lower part, compressing the insert(s) and the SMC blank(s), resulting in the creep of the SMC blank(s) under the effect of pressure and their crosslinking under the temperature of the mold so that the, or at least one of the, inserts is overmolded.

The method is remarkable in that the insert or at least one of the inserts comprises at least one relief extending from one of its faces and in that:

when placing the insert(s) in the mold, the insert or at least one of the inserts bears against the, or at least one of the, SMC blanks by the relief(s) extending from their underside, and/or in that the, or at least one of the, SMC blanks rests on the, or at least one of the, reliefs extending from the upper face of the, or at least one of the, inserts.

In a variation, the method of manufacturing a hybrid part comprises overmolding at least one insert with one or more GMT blanks, by means of a mold comprising an upper part and a lower part. The method comprises the following steps:

heating the GMT blank(s);

placing the insert(s) and the GMT blank(s) in the lower part of the mold, the, or at least one of the, blanks being in contact with the upper or lower face of the, or at least one of the, inserts;

closing the mold by positioning the upper part on the lower part, the mold not being heated, compressing the insert(s) and the GMT blank(s), resulting in the creep of the GMT blank(s) under the effect of pressure so that the, or at least one of the, inserts is over-molded.

The method is remarkable in that the insert or at least one of the inserts comprises at least one relief extending from one of its faces and in that:

when placing the insert(s) in the mold, the insert or at least one of the inserts bears against the, or at least one of the, GMT blanks by the relief(s) extending from their underside, and/or in that the, or at least one of the, GMT blanks rests on the, or at least one of the, reliefs extending from the upper face of the, or at least one of the, inserts.

Thus when the insert 1 has reliefs 5a on its lower face 7a which is intended to be disposed facing the lower part of the mold 13, or facing an SMC or a GMT blank, and when the insert 1 is placed in the mold, it will bear against the internal wall of the lower part 13 of the mold by means of the reliefs 5a which extend from its lower face 7a, or against the surface of an SMC or a GMT blank. The presence of at least three non-aligned reliefs 5a on this lower face 7a therefore allows stable support and a correct orientation of the insert 1 in the mold.

When the insert 1 has reliefs 5b on its upper face 7b which is intended to be disposed facing the upper part 15 of the mold, or facing an SMC or a GMT blank, and the mold is closed, the insert 1 will be in contact with the internal wall upper part 15 of the mold or with the surface of an SMC or a GMT blank.

Preferably, the insert 1 has reliefs 5a,b on both its lower 7a and upper 7b faces, so that the closure of the mold will fix the insert 1 in position in the mold, for example in a central position depending on the height of the mold. The method and insert are remarkable in that the mold does not to be provided with means for positioning the insert 1. The positioning means in the mold comprise the reliefs 5 exhibited by the insert 1.

Those skilled in the art will benefit from all the reliefs 5 extending from one of the upper, lower or possibly lateral faces of the insert have a similar height. The insert 1 will then be positioned so that the face 7 bearing the reliefs 5 is parallel to the wall of the mold placed opposite it (or of an SMC or a GMT blank). However, if necessary, a person skilled in the art may favor a difference in height between reliefs of the same face of the insert with a view to an oblique positioning of the insert 1 with respect to at least one of the walls of the mold and therefore to one face of the part, once molded.

In FIGS. 1 to 4, the reliefs 5 borne by the insert 1 are in the form of stamped sheet metal strips 19 (see FIG. 4) cut from the body 9 of the insert 1 and having two ends connected to the body. This type of relief is advantageous in that it creates creep zones or paths 21 allowing the passage of the plastic or composite material through the insert, and promotes the anchoring of the insert 1 in the hybrid part. The material creep paths through the insert 1 and more precisely its reliefs 5 are illustrated with arrows in FIGS. 2 and 3.

Figure 4:
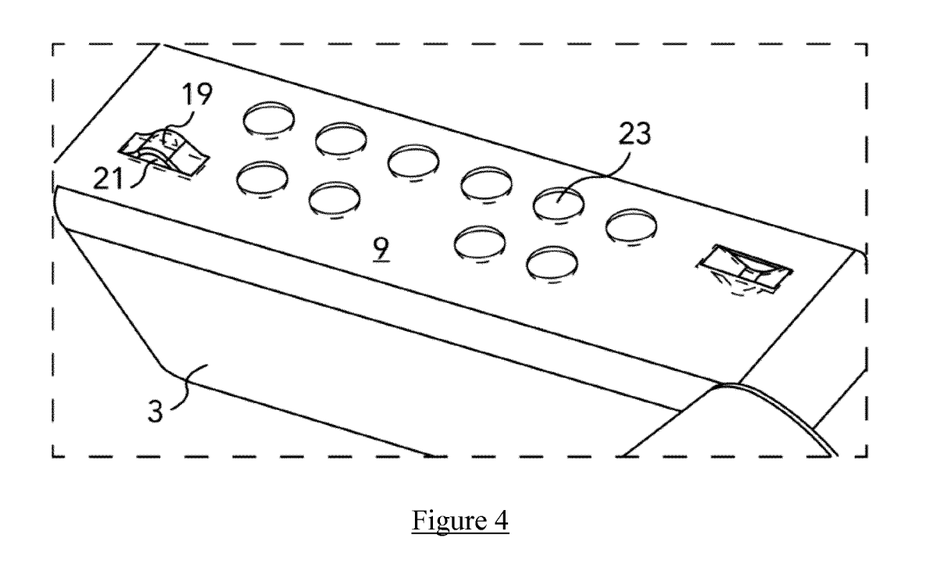
FIG. 4 is a partial view of one embodiment of an insert having a combination of reliefs and creep holes. The reliefs shown are in the form of stamped sheet metal strips cut from the body of the insert and having two ends connected to the body.

According to a preferred embodiment of the insert illustrated in FIG. 4, the body 9 of the insert 1 has at least one creep hole 23, or perforation, allowing the passage of the plastic or composite material through the insert 1 during the overmolding operation. This configuration is particularly useful for ensuring good anchoring of the insert in the plastic material which covers it. It can be adopted whether or not the reliefs have associated material creep paths. It can be seen that the insert can have both creep paths 21 which are associated with the reliefs 5 and creep holes 23 which are not associated with the reliefs.

Figure 5:
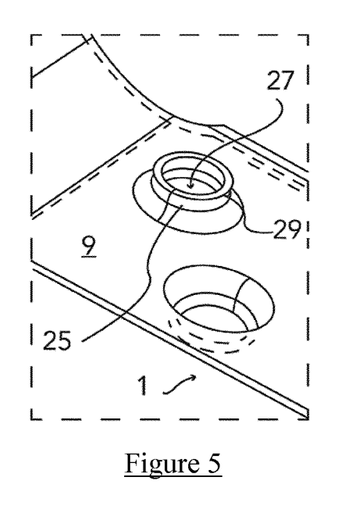
FIG. 5 is a partial view of one embodiment of an insert, the reliefs of which are in the form of rimmed holes.

Preferably, creep paths 21 are associated with the reliefs 5. The operation of forming the relief(s) 5 will create a hole 21 in the body 9 of the insert 1. This is, for example, the case when the shaping of the reliefs comprises operations for punching and/or cutting the sheet forming the insert 1. For example, as illustrated in FIG. 5, the relief 5 can be a rimmed hole 25, that is to say, a perforation 27 surrounded by a rim 29, the rim 29 forming the relief 5 for the positioning of the insert 1. The perforation 27 forms the creep path 21 associated with the relief 5.

Figure 7:
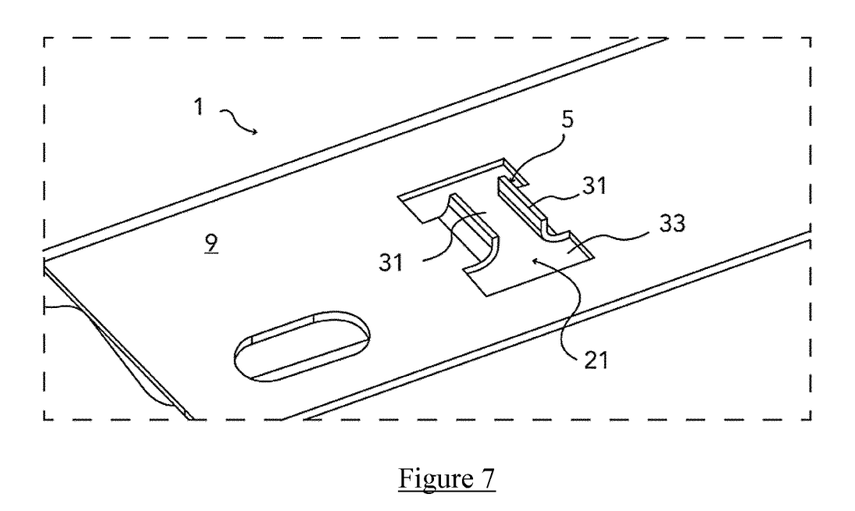
FIG. 7 is a partial view of one embodiment of an insert, the reliefs of which are in the form of a bump and are associated with creep holes.

According to another embodiment illustrated in FIG. 7, the relief 5 may be constituted by one or more tabs 31 cut from the sheet forming the body 9 of the insert 1 and bent. The creep path 21 associated with the relief 5 is formed by the perforation 33 created by the cutting-bending of the tab(s) 31.

Figure 8:
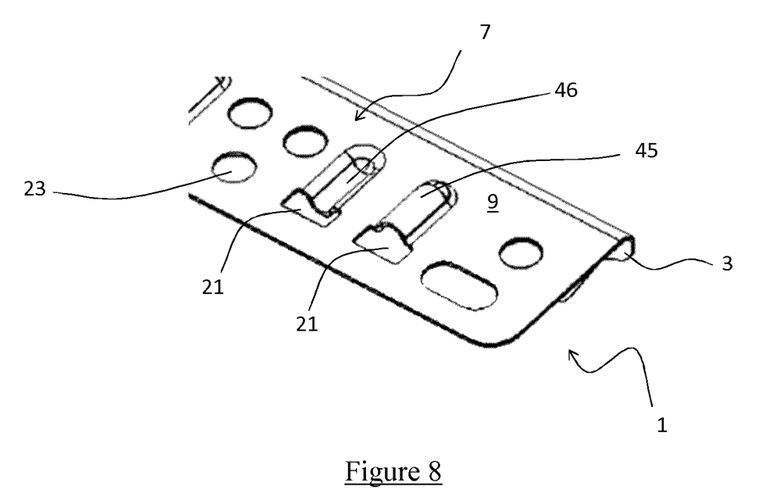
FIG. 8 is a partial view of one embodiment of an insert, the reliefs of which are in the form of elongated bumps, and comprising a creep path at one of the ends of these elongated bumps.

According to another embodiment illustrated in FIG. 8, the relief 5 is in the form of an elongated convex zone 45 extending over one of the faces 7 of the insert 1. The face of the insert 1 opposite the face comprising the relief 5 comprises a recessed zone 46 facing the relief 5, of a shape complementary to the relief 5. The recessed zone 46 therefore also has an elongated shape. For example, the elongated convex zone is on the face 7a and the recessed zone 46 is on the face 7b. The relief 5 is obtained for example by deformation of the sheet forming the body 9 of the insert 1, for example by stamping. The deformation of this sheet forming the body 9 creates the elongated convex zone 45 on one of the faces of the insert 1 and the recessed zone 46 on the opposite face of the insert 1. A creep path 21 is formed at one of the ends of this elongated convex zone 45. This creep path 21 can be produced for example by cutting the sheet forming the body 9, at the time of stamping of the sheet forming the body 9 of the insert, for example by punching. As shown in FIG. 8, this creep path 21 forms an opening at the end of the elongated convex zone 45, passing through the insert 1. This means that one of the ends of the elongated convex zone 45 opens into this opening forming the creep path 21, the recessed zone 46 also opening at its end into this same opening. During the manufacture of the hybrid part 11, the recessed zone 46 makes it possible to guide the plastic or composite material toward the creep path 21 which is associated with the relief 5, by creating a channel directing the movement of the plastic or composite material toward the creep path 21, during the overmolding of the plastic or composite material on the insert 1. The insert 1 may comprise several elongated convex zones 45 on one of the faces 7a or 7b of the insert 1. As a variant, elongated convex zones 45 are disposed on each of the two faces 7a and 7b of the insert 1, and the insert 1 therefore also comprising recessed zones 46 on each of these faces 7a and 7b.

In a variant which is not shown, the relief 5 is in the form of a half of a hemisphere, with a creep path 21 adjacent to the relief so that the edge of the hemisphere protruding from the insert 1 forms at least part of one of the edges of the creep path 21.

These embodiments can be associated with the presence of creep holes 23 in the insert 1.

Figure 6:
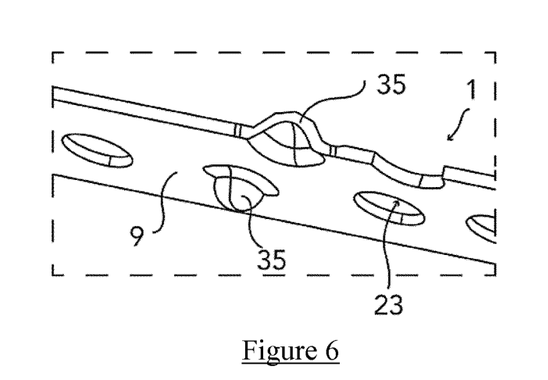
FIG. 6 is a partial view of one embodiment of an insert, the reliefs of which are in the form of tabs cut out and bent from the body of the insert.

According to another preferred embodiment of the invention illustrated in FIG. 6, the relief(s) of the insert 5 is (are) produced by stamping so that their shaping does not create a creep path (or holes) in the sheet forming the body 9 of the insert. The reliefs 5 may be in the form of circular or elongated bumps 35, or in the form of ribs extending over all or part of the insert 1 in any direction. When the insert has such reliefs 5, those skilled in the art will benefit from using an insert 1 also having creep holes 23.

Advantageously and as illustrated in FIGS. 2 and 3, the height "h" exhibited by the relief(s) 5 extending from a face 7 of the insert 1 is equal to the thickness "e" of the layer of plastic or composite material 17, overmolded on the face 7 of the insert 1. Nevertheless, in certain cases, during the overmolding operation, the material (or resin) injected into the mold may infiltrate between the mold and the ends of the reliefs 5 bearing against the walls of the mold. Thus, the height "h" of the relief(s) 5, as measured from the face 7 of the insert 1 from which they extend, corresponds to at least 90% of the thickness of the layer of plastic or composite material overmolded on the face 7 of the insert, preferably at least 95%, more preferably at least 98%. In other words, the height "h" exhibited by the relief(s) 5, as measured from the face 7 of the insert 1 from which they extend, is less than or equal to the thickness "e" of the layer of plastic or composite material 17 overmolded on the face 7 of the insert 1. This makes it possible to benefit from the spring effect of the sheet metal and does not require a precise adjustment of the dimensions.

The hybrid part 11 according can be made of plastic materials or of composite material, preferably of composite material. The selected composite material can be a thermoplastic or thermosetting composite material. Composite materials are defined in the context of the invention as having a polymer matrix and one or more reinforcing elements. The reinforcing elements comprise or consist of fibers or a mixture of fibers selected from glass, carbon, ceramic, graphite, natural fibers such as flax, hemp or bamboo fibers, organic polymers such as polyester fibers. Preferably, the fibers of the reinforcing elements are glass fibers.

The thermoplastic polymer matrix will advantageously be selected from one or more materials chosen from polypropylenes (PP), polyphthalamides (PPA), polyetheretherketones (PEEK), polyphenylene sulfides (PPS), polyamide-imide (PAI), polyetherimides (PEI), polyarylamides (PAA), or polyamides (PA) such as for example polyamide 6 (PA 6 or polycaprolactam) or polyamide 6.6 (PA 6.6 or polyhexamethylene adipamide).

The thermosetting polymer matrix will advantageously be selected from unsaturated polyesters, polyurethanes, vinyl esters or polyepoxides.

The insert can be fully or partially embedded in the plastic or composite material. In a preferred embodiment, the insert 1 is partly overmolded. Thus, preferably, the insert 1 has a part overmolded on at least one of its faces and a free part in that it is not covered with material (or resin). Advantageously, the free part 3 and the part intended to be overmolded are arranged to extend perpendicularly to one another as illustrated in FIGS. 1, 3 and 4.

Indeed, according to a preferred embodiment (not shown), the hybrid part is a load floor of a motor vehicle. Preferably, the floor is made of a composite material. For example, the load floor is made of polyester filled with glass fibers. The floor advantageously comprises a metal border intended to be welded to the rear part of the vehicle base, as is the case for entirely metal load floors. This metal border is formed by one or more inserts according to the invention, so that the insert(s) is (are) partially overmolded in the floor and have a part embedded in the plastic or composite material and an external part intended to be welded.

According to a preferred embodiment, the load floor comprises a plurality of inserts, at least one being arranged on each of its edges. The insert(s) is (are) preferably made of steel and are in the form of a stamped sheet and/or in the form of profiles. The insert can also be made of aluminum or magnesium. For example, and as described in document WO2014/131967, the inserts form a frame. The inserts disposed in the front and rear part of the floor are stamped and the two lateral parts are profiles. The rear part of the floor, made of composite material only, has stiffening ribs and possibly a cavity intended to receive the spare tire.

The invention claimed is:

1. A hybrid part for a motor vehicle comprising at least one metal insert overmolded in a layer of plastic or composite material, the insert comprising a body defining an upper face and a lower face, and being at least partially covered on at least one of said upper and lower faces by said layer of said plastic or composite material of a defined thickness; the hybrid part comprising at least one relief extending from at least one of said upper and lower faces and in that the height of said at least one relief is less than or equal to the thickness of said layer of plastic or composite material;
   wherein the at least one relief comprises at least one relief extending from each of said lower and upper faces, said at least one relief being a stamped sheet metal strip cut from the body along two opposite longitudinal sides and having two opposite ends connected to the body, such that a creep path allowing the passage of the plastic or composite material through said insert during an overmolding operation is created below said at least one relief between the two ends.

2. The hybrid part according to claim 1, wherein the insert further comprises at least one creep hole allowing the passage of the plastic or composite material through said insert during an overmolding operation.

3. The hybrid part according to claim 1, wherein the hybrid part constitutes a load floor made of composite material comprising a metal border which is adapted to be welded to a rear part of a base of a motor vehicle.

4. A vehicle comprising at least one hybrid part according to claim 1.

5. A method for manufacturing a hybrid part, said hybrid part comprising at one or more metal inserts which are at least partly overmolded in a layer of plastic or composite material, at least one of said one or more metal inserts comprising at least one relief extending from one of its upper and lower faces, said at least one relief being a stamped sheet metal strip cut from a body of the insert along two opposite longitudinal sides and having two opposite ends connected to the body, such that a creep path allowing the passage of the plastic or composite material through said insert during an overmolding operation is created below said at least one relief between the two ends; the method using a mold comprising a lower part and an upper part, and comprising the following steps:

placing said at least one insert in the lower part of the mold, closing the mold by positioning the upper part on the lower part; and injecting the plastic or composite material into the mold; and wherein, during the operation of placing the one or more inserts in the mold, the one or more inserts are placed in abutment against the lower part of said mold by the at least one relief extending from the lower face disposed opposite the lower part of the mold; and/or in that wherein, during the closing of the mold, the one or more inserts (are) in contact with the upper part of the mold by the at least one relief extending from the upper face disposed opposite the upper part of the mold.

6. A method of manufacturing a hybrid part according to claim 1, said hybrid part comprising one or more inserts which are at least partly overmolded by one or more blanks of sheet molding compound (SMC) or glass mat thermoplastic (GMT), at least one of the one or more inserts comprising at least one relief extending from at least one of its faces, said at least one relief being a stamped sheet metal strip cut from the body along two opposite longitudinal sides and having two opposite ends connected to the body, such that a creep path allowing the passage of the plastic or composite material through said insert during an overmolding operation is created below said at least one relief between the two ends; the method using a mold comprising an upper part and a lower part and comprising the following steps:

placing the one or more inserts and the one or more SMC or GMT blanks in the lower part of the mold, with at least one of the SMC or GMT blanks being in contact with the upper or lower face of the-one or more inserts;

closing the mold by positioning the upper part on the lower part;

compressing the one or more inserts and the one or more SMC or GMT blanks, so that the-one or more inserts is overmolded by said one or more blanks; and when placing the one or more inserts in the mold, at least one of the one or more inserts bears against the one or more-SMC or GMT blanks by the at least one relief extending from their underside, and/or in that the, or at least one of the one or more SMC or GMT blanks rests on the-at least one relief extending from the upper face of the one or more-inserts.

7. The hybrid part according to claim 1 wherein the metal insert comprises at least three non-aligned reliefs extending from one of said upper and lower faces.

8. The hybrid part according to claim 1 wherein the metal insert comprises at least three non-aligned reliefs extending from both of said upper and lower faces.

9. The hybrid part according to claim 3 wherein the metal border is a free part of the metal which is free of the composite material from which the floor is made.

10. An insert for a hybrid part, the insert comprising a body defining an upper face and a lower face and at least one relief extending from at least one of said upper and lower faces, said at least one relief being combined with a creep path allowing the passage of the plastic or composite material through said insert during an overmolding operation of said insert, said at least one relief being a stamped sheet metal strip cut from the body along two opposite longitudinal sides and having two opposite longitudinal ends connected to the body, such that the creep path allowing the passage of the plastic or composite material through said insert during an overmolding is created below said at least one relief between the two longitudinal ends, wherein the at least one relief comprises at least one relief extending from each of said lower and upper faces.

11. The hybrid part according to claim 1 further wherein the stamped sheet metal strip has the shape of an arch and defines a transverse passage for the plastic or composite material during an overmolding operation, below the arch from one of the longitudinal sides of the stamped sheet metal strip to the other longitudinal side of the stamped sheet metal strip, on said upper or lower face.

12. The method according to claim 5 further wherein the stamped sheet metal strip has the shape of an arch and defines a transverse passage for the plastic or composite material during an overmolding operation, below the arch from one of the longitudinal sides of the stamped sheet metal strip to the other longitudinal side of the stamped sheet metal strip, on said upper or lower face.

13. The method according to claim 6 wherein the stamped sheet metal strip has the shape of an arch and defines a transverse passage for the plastic or composite material during an overmolding operation, below the arch from one of the longitudinal sides of the stamped sheet metal strip to the other longitudinal side of the stamped sheet metal strip, on said upper or lower face.

14. The insert according to claim 10 further wherein the stamped sheet metal strip has the shape of an arch and defines a transverse passage for the plastic or composite material during an overmolding operation, below the arch from one of the longitudinal sides of the stamped sheet metal strip to the other longitudinal side of the stamped sheet metal strip, on said upper or lower face.

* * * * *